(12) United States Patent  (10) Patent No.: US 8,272,197 B2
Jung  (45) Date of Patent: Sep. 25, 2012

(54) HANDHELD LAWN MOWER (76) Inventor: Man-Young Jung, Pasadena, CA (US)

( * ) Notice: Subject to any disclaimer, the term of this patent is extended or adjusted under 35 U.S.C. 154(b) by 184 days.

(21) Appl. No.: 12/815,687

(22) Filed: Jun. 15, 2010

(65) Prior Publication Data
US 2011/0302892 A1    Dec. 15, 2011

(51) Int. Cl.
A01D 34/00    (2006.01)
(52) U.S. Cl. ........................................................ 56/16.7
(58) Field of Classification Search ................ 56/16, 7, 56/10.2 R, 10.5, 11.9, 14.8, 255, DIG. 4, 56/DIG. 15
See application file for complete search history.

(56) References Cited

U.S. PATENT DOCUMENTS

| 1,669,471 | A | * | 5/1928 | Jones | 56/16.6 |
|---|---|---|---|---|---|
| 3,230,695 | A | * | 1/1966 | West | 56/10.5 |
| 3,942,604 | A | * | 3/1976 | Black, III | 180/272 |
| 4,952,222 | A | * | 8/1990 | Tobias | 56/1 |
| 5,435,117 | A | * | 7/1995 | Eggena | 56/10.2 D |
| 5,619,845 | A | * | 4/1997 | Bruener et al. | 320/137 |
| 5,706,638 | A | * | 1/1998 | Kinder et al. | 56/10.2 E |
| 5,953,890 | A | * | 9/1999 | Shimada et al. | 56/11.9 |
| 6,116,007 | A | * | 9/2000 | Eggena et al. | 56/15.1 |
| 6,832,466 | B2 | * | 12/2004 | Freiberg et al. | 56/10.4 |
| 7,399,255 | B1 | * | 7/2008 | Johnson et al. | 477/42 |
| 2002/0174639 | A1 | * | 11/2002 | Fowler | 56/17.5 |

* cited by examiner

Primary Examiner — Thomas B Will
Assistant Examiner — Mai Nguyen
(74) Attorney, Agent, or Firm — Clement Cheng (57) ABSTRACT A handheld lawnmower has a housing and a pair of wheels mounted on an axle. The axle is mounted to the housing. A handle mount is formed on the housing. The handle is connected to the handle mount, and the handle extends above the housing. An electric motor is connected to a top portion of the housing at a blade assembly cap. A blade assembly has a blade connection header, and a blade shaft is connected to the blade connection header at a blade shaft first end. The blade shaft is connected to a blade junction at a blade shaft second end, and a blade has a leading edge. The blade assembly is mounted in a direction to provide a flat cutting angle for the blade. A battery is electrically connected to the electric motor.

6 Claims, 7 Drawing Sheets

HANDHELD LAWN MOWER

FIELD OF THE INVENTION

The present invention is in the field of lawnmowers.

DISCUSSION OF RELATED ART

Lawnmowing has been popular for many years for keeping the lawn tidy. The earlier lawnmowers were mechanically operated and blade driven. For example U.S. Pat. No. 188,788 issued 1877 to Farnum shows a multiplicity of blades rotating and engaging with a large main blade. Earlier lawnmowers used a number of rectangular blades mounted on arms, as described in U.S. Pat. No. 844,469 issued to Baker in 1907. Earlier lawnmowers were push lawnmowers, or could he used with a pulling action. The motion of the wheels was typically used for driving the blade assembly. Unfortunately, as many people have experienced, the push mechanical lawnmower is sometimes difficult to use and has a tendency to get stuck.

With the advent of inexpensive gasoline internal combustion lawnmowers, many lawnmowers became gasoline motor driven, however that also brought its own problems in the form of loud sound pollution. In later designs, the invention of motors and batteries provided a battery powered lawnmower for a cordless and quiet function, as is described in Brewster, U.S. Pat. No. 4,145,864 entitled Battery Powered Lawnmower, issued Mar. 27, 1979 which provided for a plug-in electrical lawnmower which could also work as a battery powered lawnmower, the disclosure of which is incorporated herein by reference. Additional advances in cordless electric motors have produced a variety of improved circuits for speed foldback routine for avoiding excessive drain on the battery as described in Carrier U.S. Pat. No. 5,937,622 issued Aug. 19, 1999 entitled Cordless Electric Lawnmower Having Energy Management Control System, the disclosure of which is incorporated herein by reference.

Unfortunately, even if the cordless electric lawnmower does not require a cable, it still requires some time to set up. Accordingly, a small size hand held lawnmower for odd shaped and small discontinuous patches of lawn.

SUMMARY OF THE INVENTION

The handheld lawnmower is designed for small applications. The total weight is small enough for a user to pick up from the ground. When the user picks up the lawnmower, the sensors on the wheels or the wheel axles automatically turn off the power to the lawnmower. Thus, a user first mows one section and then can mow a different section by picking up the lawnmower which automatically turns off the power and stops the blade.

A handheld lawnmower has a housing and a pair of wheels mounted on an axle. The axle is mounted to the housing. A handle mount is formed on the housing. The handle is connected to the handle mount, and the handle extends above the housing. An electric motor is connected to a top portion of the housing at a blade assembly cap. A blade assembly has a blade connection header, and a blade shaft is connected to the blade connection header at a blade shaft first end. The blade shaft is connected to a blade junction at a blade shaft second end, and a blade has a leading edge. The blade assembly is mounted in a direction to provide a flat cutting angle for the blade. A battery is electrically connected to the electric motor.

An automatic shutoff means deactivates the electric motor when the handheld lawnmower is in a raised position, and the automatic shutoff means is deactivated when the wheels of the handheld lawnmower are placed on the ground. The housing is a substantially cylindrical member. The lawnmower optionally includes pass code buttons for controlling access to lawnmower activation. The lawnmower preferably has a battery cap fitting over a battery opening. The battery opening is shaped for receiving a battery within the battery opening. The battery opening is located on the handle above the handle mount. The lawnmower has a clippings exhaust port, wherein grass clippings are removed from the clippings exhaust port. The lawnmower may have a rolling cover, and the rolling cover has an open position and a closed position. The rolling cover rotates between the open position and the closed position. The lawnmower has an axle slot, and the axle slot receives the axle within the slot. The slot provides a higher position corresponding to an activated position and a lower position for the axle corresponding to a deactivated position.

The handheld lawnmower has a safety cover that is rollup retractable into the housing. If the housing is generally a cylindrical body, the re-tractable rollup safety cover may rollup into a deployed position to cover the blades. The retractable safety cover can retract to a retracted position along the cylindrical body also. The retractable safety cover can be controlled by a knob 89 that rotates for rotating the retractable safety cover between a rolled up position and a deployed position. Another safety feature of the present invention is that it uses a speed foldback routine for avoiding excessive drain on the battery, or if one of the blades hits a branch or a finger, the motor will stop or decrease power. The starting of the lawnmower preferably requires a code entry such as on code buttons 87. Alternatively, the actuation of the handheld lawnmower requires a first actuator and a second actuator. The first actuator is placed in a first location away from the second actuator. In this manner, the handheld lawnmower may be safer around children.

The following call a list of elements can be a useful guide in understanding the invention:

Wheel Assembly
21 Tire
22 Wheel Axle
30 Blade Assembly
31 Blade Assembly Cap
32 Motor
33 Blade Connector
34 Bolt
35 Blade Connection Header
36 Blade Shaft
37 Blade Junction
38 Blade Trailing Edge
39 Blade Leading Edge
40 Handle Assembly
41 Battery 42 Battery Cap
43 Battery Handle Adapter
44 Handle
45 Handle Flange
46 Handle Pin
47 Handle Connection
48 Battery Opening
51 Exhaust Cap
52 Exhaust Port
53 Exhaust Port Connection
54 Exhaust Hose
87 Pass Code Buttons
88 Rolling Cover
89 Rolling Cover Knob
91 Lift Sensor
92 Lower Axle Position
93 Upper Axle Position
94 Axle Slot

DETAILED DESCRIPTION

Figure 7:
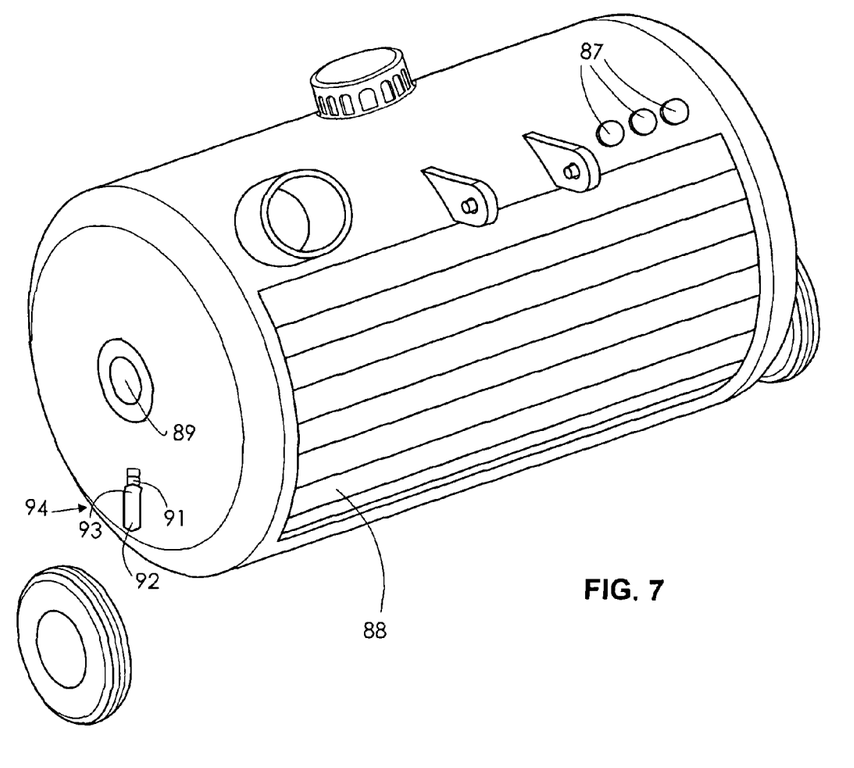
FIG. 7 is a perspective exploded view of the device showing an embodiment of the automatic shutoff means and the safety features of the invention.

The handheld lawnmower is designed to shut off when the wheels are lifted from the ground. The lawnmower shuts off automatically by an automatic shutoff means when a lift sensor 91 senses that the wheels are not touching the ground. The wheels can be connected to the axle, which has an upper position and a lower position and completes a circuit when in the upper position, but when lifted from the ground the axle lowers to a lower position so that the circuit is no longer complete, thereby shutting off power to the motor 32. The axle of the wheel is mounted in an axle slot 94 disposed on a side of the handheld lawnmower. The lower axle position 92 is the raised position where the axle does not contact the lift sensor 91, which can be a button, switch or leaf spring switch. The upper axle position 92 of the axle slot 94 corresponds with the position where the circuit is completed and the motor is capable of being energized if the user otherwise activates the motor by and activation button or trigger on the handle. The activation button or trigger on the handle can be located near the battery if the battery is located within the handle cavity.

Preferably, a pair of axles, a left axle and a right axle are mounted to the generally cylindrical housing body. The left axle, or right axle, or preferably both axles are fitted with the automatic shutoff means.

The handheld lawnmower is designed to shut off when the wheels are lifted from the ground. The lawnmower shuts off automatically by an automatic shutoff means when a lift sensor 91 senses that the wheels are not touching the ground. The wheels can be connected to the axle, which has an upper position and a lower position and completes a circuit when in the upper position, but when lifted from the ground the axle lowers to a lower position so that the circuit is no longer complete, thereby shutting off power to the motor 32. The axle of the wheel is mounted in an axle slot 94 disposed on a side of the handheld lawnmower. The lower axle position 92 is the raised position where the axle does not contact the lift sensor 91, which can be a button, switch or leaf spring switch. The upper axle position 93 of the axle slot 94 corresponds with the position where the circuit is completed and the motor is capable of being energized if the user otherwise activates the motor by and activation button or trigger on the handle. The activation button or trigger on the handle can be located near the battery if the battery is located within the handle cavity.

Figure 1:
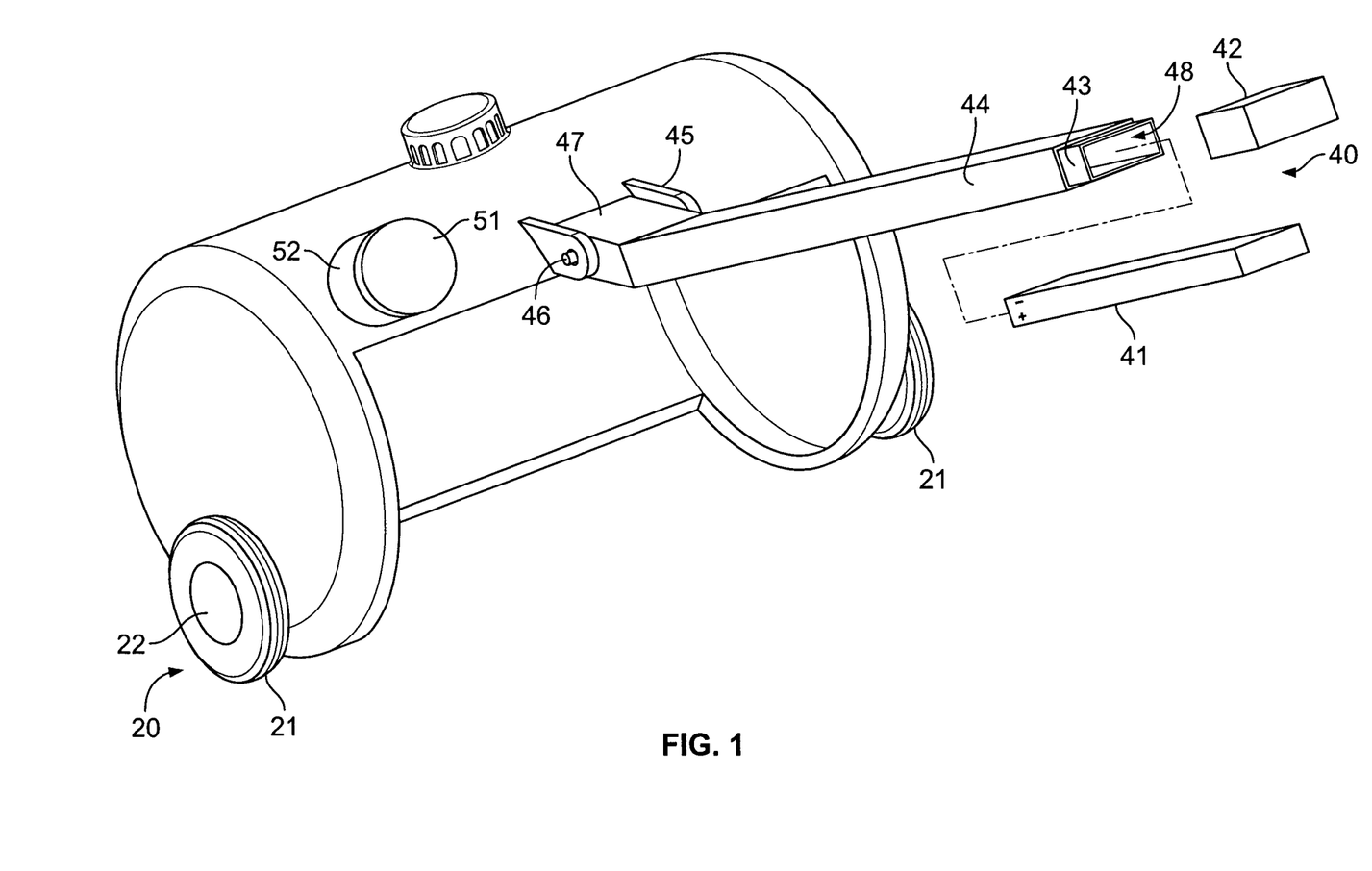
FIG. 1 is an exploded view diagram of the present invention.
Figure 2:
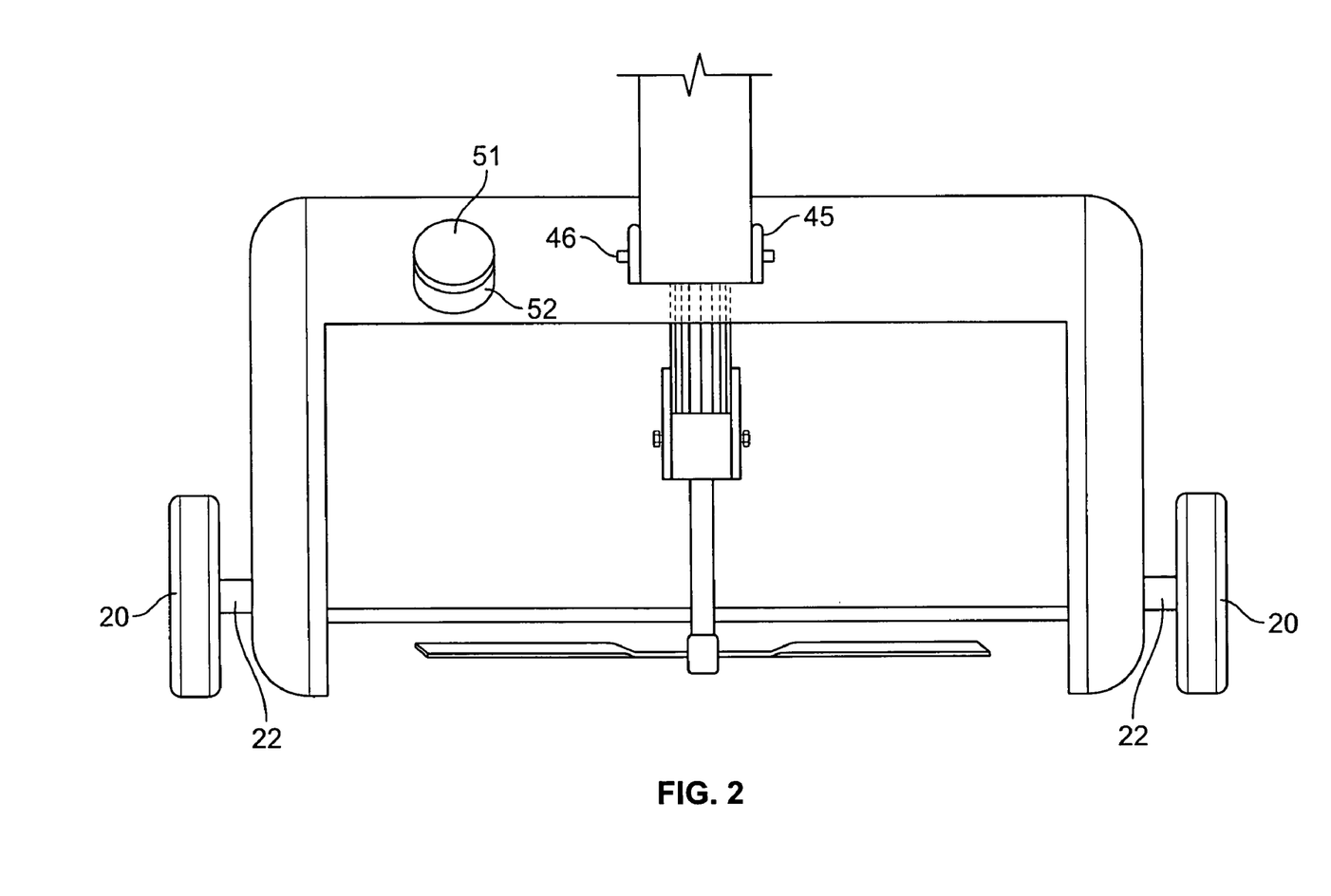
FIG. 2 is a view of the rear of the lawnmower.

The handle connection 47 may have a distal end that abuts the housing of the generally cylindrical body for limiting the movement of the handle 47 relative to the generally cylindrical body. The handle 47 may also be limited by the configuration of the flange. The handle can be constructed as a hollow tubular body having a rectangular cross-section. The handle can have a rounded rectangular cross-section or a rectangular cross-section having hard corners. The handle connection 47 is a lower part of the handle which may also have a rounded rectangular cross-section. The handle connection 47 may connect to the handle 44 at an obtuse angle. The angle can be made by welding a connection. The upper portion of the handle can have a battery 41 stowed within a battery opening 48 and secured within the battery opening by a battery cap 42 fitting over an end of the battery. The battery cap 42 may secure to a battery handle adapter 43.

The battery handle adapter may further include a shoulder receiving a lower edge of the battery cap 42. The battery can alternatively be mounted in the housing.

Figure 6:
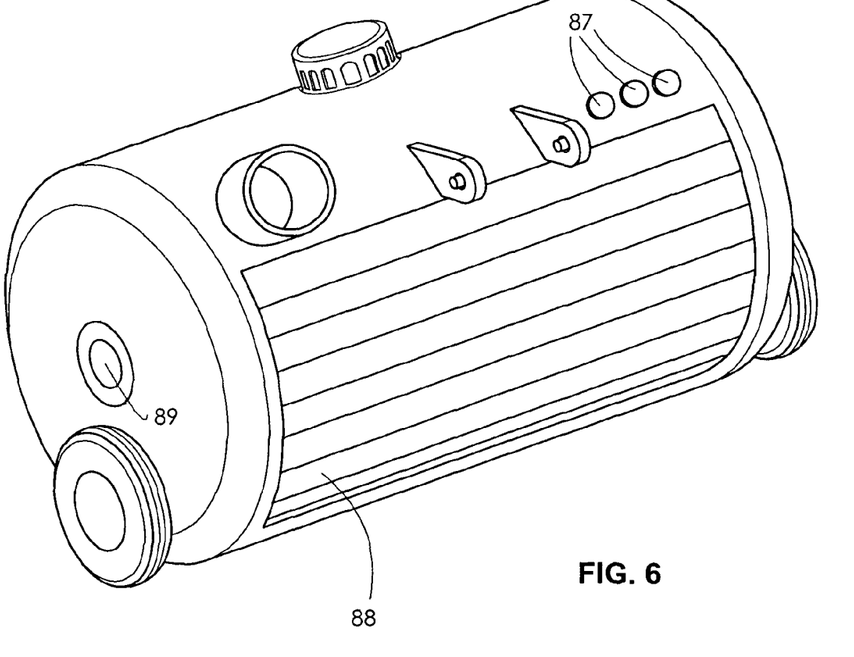
FIG. 6 is a perspective view of the device showing the safety features of the invention.

The generally cylindrical body may have an internal rim having a circular profile. The rolling cover 88 can be segmented into sections, or formed as a single curved shape having a semicircular profile. The rolling cover 88 could be made flexible, or can be substantially rigid if an arc shaped cross-section profile matches the internal rim profile. The rolling cover knob 89 is preferably mechanically connected to the rolling cover 88. The rolling cover knob 89 can be turned for actuating the rolling cover 88 between an open position and a closed position. The rolling cover knob 89 may have a press down engagement such that a user presses down on the rolling cover 89 to unlock the rolling cover knob 89. When the rolling cover knob 89 rotates into an open position or into a closed position, the locking means preferably locks the rolling cover knob 89 such that the rolling cover knob 89 pops out and the rolling cover 88 is locked into the open position or into the closed position.

The motor 32 is preferably controlled by a motor controller such as a microprocessor. The microprocessor may have a feedback motor control so that peak fluctuations of drain on battery either lead to a decrease of the voltage on the motor if the peak reaches a decreased voltage threshold, or lead to a shutdown of the motor if the peak reaches a shutdown threshold.

Figure 3:
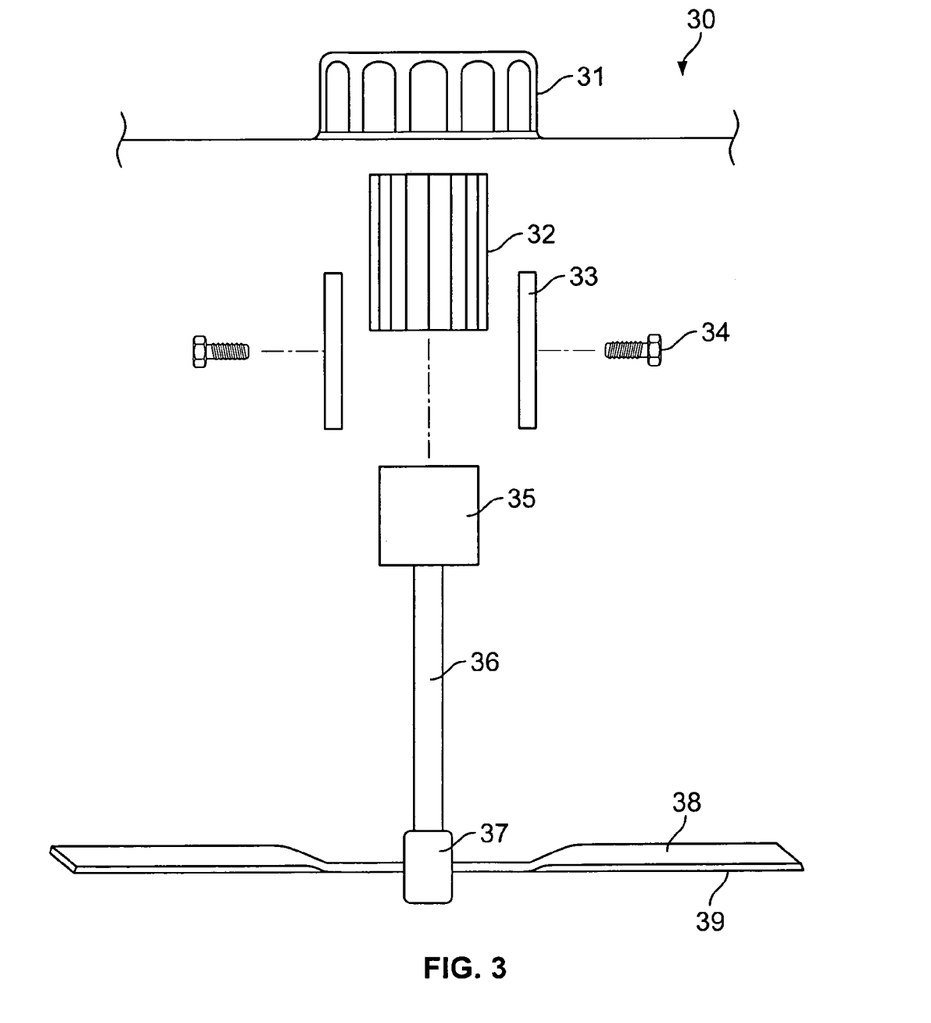
FIG. 3 is an exploded view diagram of the blade assembly.
Figure 4:
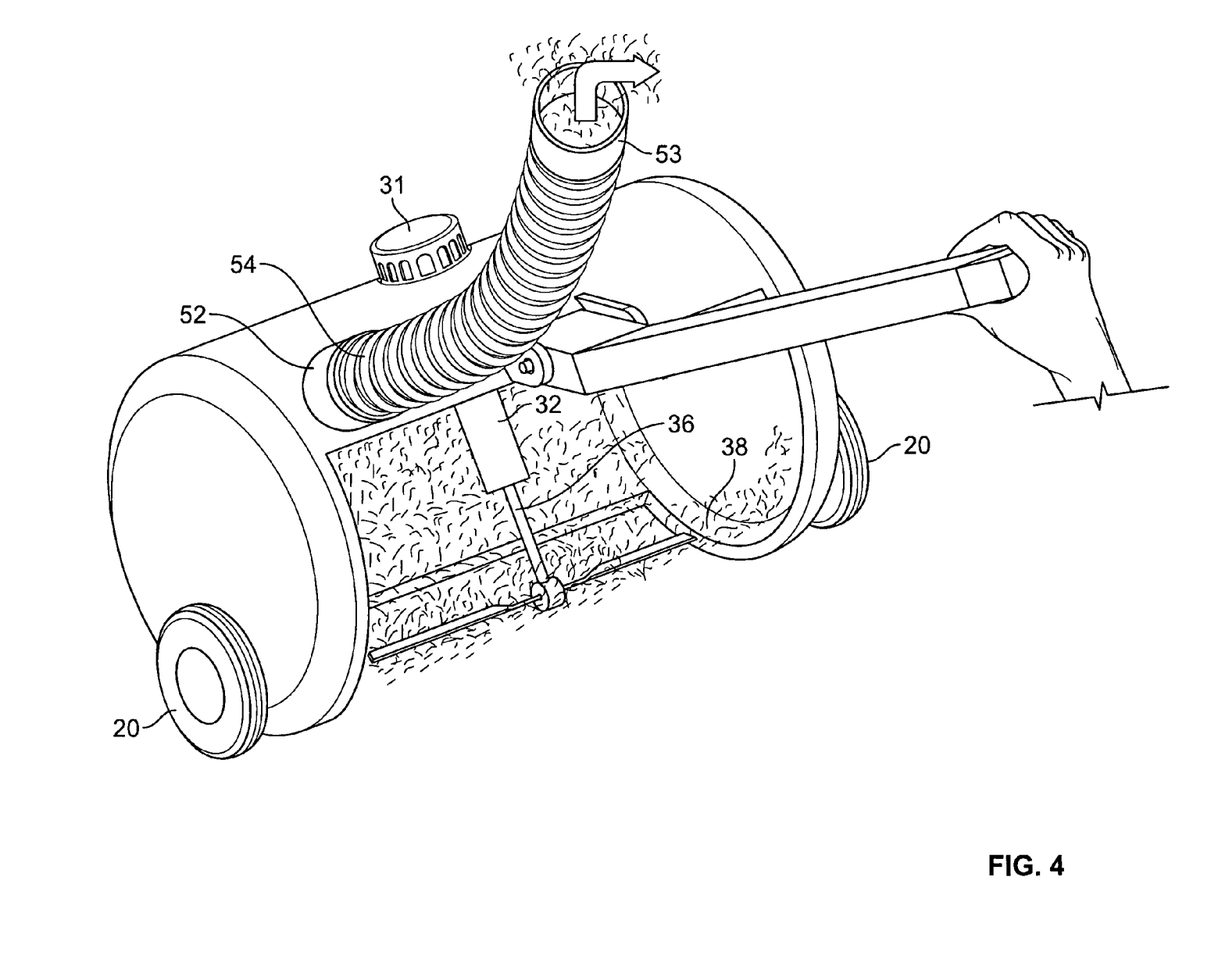
FIG. 4 is a diagram of the apparatus in actual use in a first mode of operation.
Figure 5:
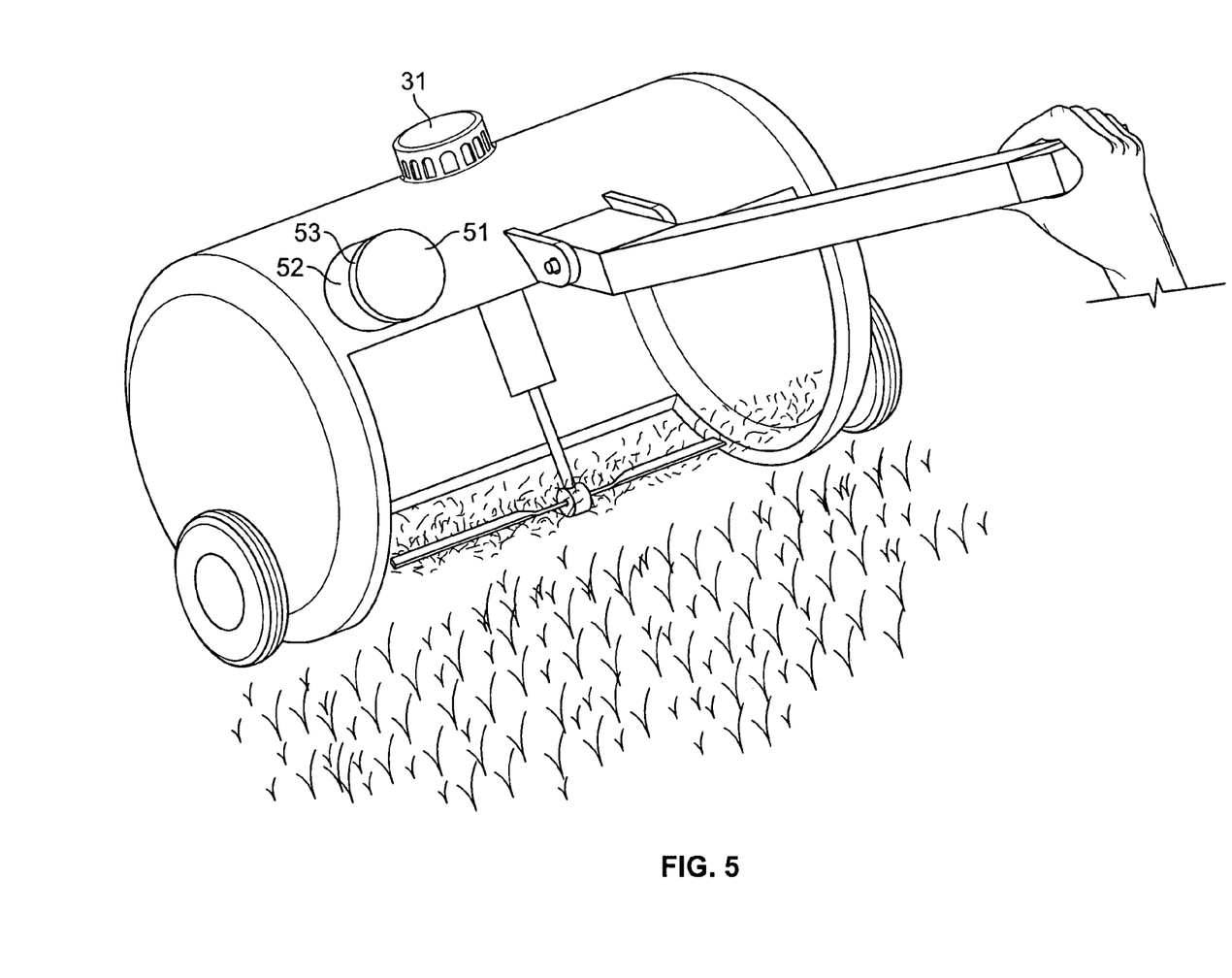
FIG. 5 is a diagram of the apparatus in a second mode of operation.

The blade assembly cap 31 secures the motor assembly and blade assembly 32 the housing. The blade assembly 31 preferably threads to the housing by threads formed on the housing. Threads may be formed on an inside surface of the blade assembly cap 31. The motor is preferably secured to a pair of blade connector 33 by a pair of bolts 34. The blade connectors 33 connect to a blade connection header 35 that has a shaft 36 extending from the blade connection header 35. The blade connection header 35 may have mechanical dampening and act as a mechanical spring between the shaft 36 and the blade connection header 35 for decreasing high-frequency vibration. The shaft 36 is connected to a blade junction 37. The blade junction 37 as a pair of blades mounted on it. The blades include a blade trailing edge 38 and a blade leading edge 39. The leading edge is preferably sharpened for cutting grass. The blade can be made as a propeller shape, or as a wire, such as a nylon or steel wire.

During operation of the handheld lawnmower, the clippings may be exhausted through an exhaust port 52. The exhaust port has a removable and replaceable exhaust cap 51. The exhaust hose 54 is preferably a flexible hose that can connect to a bag of clippings. The exhaust hose 54 terminates at an exhaust port connection 53 which can be threaded to or clipped to a clipping bag. The exit from the exhaust port connection 53 can be diverted to a bag of clippings. As the lawnmower cuts additional clippings, the clippings may be diverted by vacuum through the exhaust port 52. The blade trailing edge is preferably propeller shaped for diverting airflow upwards to the exhaust port 52.

The foregoing describes the preferred embodiments of the invention. Modifications may be made without departing from the spirit and scope of the invention as set forth in the following claims. The present invention is not limited to the embodiments described above, but encompasses any and all embodiments within the scope of the following claims.

The invention claimed is:

1. A lawnmower comprising:
   a. a housing;
   b. a pair of wheels mounted on an axle, wherein the axle is mounted to the housing;
   c. a handle mount formed on the housing;
   d. a handle connected to the handle mount, wherein the handle extends above the housing;
   e. an electric motor connected to a top portion of the housing at a blade assembly cap;
   f. a blade assembly comprising a blade connection header, a blade shaft connected to the blade connection header at a blade shaft first end, wherein the blade shaft is connected to a blade junction at a blade shaft second end, and a blade has a leading edge, wherein the blade assembly is mounted in a direction to provide a flat cutting angle for the blade;
   g. a battery electrically connected to the electric motor;
   h. an automatic shutoff means that deactivates the electric motor when the handheld lawnmower is in a raised position, wherein the automatic shutoff means is deactivated when the wheels of the handheld lawnmower are placed on a ground; and
   further comprising an axle slot on the housing, wherein the axle slot receives the axle within the slot, wherein the axle slot provides a higher position corresponding to an activated position and a lower position for the axle corresponding to a deactivated position, wherein the electric motor is capable of being energized in the activated position, and wherein the electric motor is not capable of being energized in the deactivated position, wherein the automatic shutoff means comprises the axle slot on the housing that turns off the electric motor when the axle falls from the higher position to the lower position when a user lifts the lawnmower.

2. The lawnmower of claim 1, wherein the housing is a substantially cylindrical member.

3. The lawnmower of claim 1, further comprising pass code buttons for controlling access to lawnmower activation.

4. The lawnmower of claim 1, further comprising a battery cap fitting over a battery opening, wherein the battery opening is shaped for receiving a battery within the battery opening, wherein the battery opening is located on the handle above the handle mount.

5. The lawnmower of claim 1, further comprising a clippings exhaust port, wherein grass clippings are removed from the clippings exhaust port.

6. The lawnmower of claim 1, further comprising a rolling cover, wherein the rolling cover has an open position and a closed position, wherein the rolling cover rotates between the open position and the closed position.

* * * * *